United States Patent
Holmes et al.

(10) Patent No.: US 10,181,120 B1
(45) Date of Patent: Jan. 15, 2019

(54) METHODS AND SYSTEMS OF EMV CERTIFICATION

(71) Applicant: U.S. Bancorp, National Association, Minneapolis, MN (US)

(72) Inventors: Elizabeth Holmes, Suwanee, GA (US); Utthej Nukala, Alpharetta, GA (US); Jose Rivera, Roswell, GA (US); Terron Hyde, Atlanta, GA (US); James Cantrell, Duluth, GA (US)

(73) Assignee: U.S. Bancorp, National Association, Minneapolis, MN (US)

( * ) Notice: Subject to any disclaimer, the term of this patent is extended or adjusted under 35 U.S.C. 154(b) by 0 days.

(21) Appl. No.: 15/932,200

(22) Filed: Feb. 16, 2018

(51) Int. Cl.
  *G06Q 20/32* (2012.01)
  *G06Q 20/20* (2012.01)
  *G06Q 20/40* (2012.01)

(52) U.S. Cl.
  CPC ....... *G06Q 20/3278* (2013.01); *G06Q 20/204* (2013.01); *G06Q 20/4016* (2013.01)

(58) Field of Classification Search
  CPC ............ G06Q 20/3278; G06Q 20/204; G06Q 20/4016
  USPC .......................................................... 705/17
  See application file for complete search history.

(56) References Cited

U.S. PATENT DOCUMENTS

| | | |
|---|---|---|
| 6,783,064 B1 | 8/2004 | Green et al. |
| 6,785,845 B2 | 8/2004 | Venkataraman |
| 6,880,751 B2 | 4/2005 | Okamura et al. |
| 7,302,683 B2 | 11/2007 | Ogilvy |
| 8,132,713 B2 | 3/2012 | Kekicheff et al. |
| 8,971,821 B2 | 3/2015 | Schlub et al. |
| 9,449,320 B1 | 9/2016 | Walters et al. |
| 9,778,928 B1 | 10/2017 | Steshenko et al. |
| 2004/0129777 A1 | 7/2004 | Smith |
| 2008/0165951 A1 | 7/2008 | Somers et al. |
| 2012/0290420 A1 | 11/2012 | Close |
| 2013/0317927 A1 | 11/2013 | Bush et al. |
| 2014/0120235 A1 | 5/2014 | Jones et al. |
| 2014/0141726 A1 | 5/2014 | Schlub et al. |
| 2014/0180479 A1 | 6/2014 | Argue et al. |
| 2014/0258088 A1 | 9/2014 | Belarj |
| 2016/0103500 A1 | 4/2016 | Hussey et al. |
| 2016/0224974 A1 | 8/2016 | Yang |

(Continued)

FOREIGN PATENT DOCUMENTS

CN 106126418 A * 11/2016
WO WO-2014/056118 A1 4/2014

*Primary Examiner* — A Hunter Wilder
*Assistant Examiner* — Joseph M Mutschler
(74) *Attorney, Agent, or Firm* — Foley & Lardner LLP

(57) ABSTRACT

An illustrative embodiment disclosed herein is an EMV certification system including a credit card simulator configured to program a probe with credit card data, a point of sale simulator configured to send transaction data to a payment terminal, a robotic arm configured to perform an action on the payment terminal, and a robot controller communicatively coupled to the robotic arm. The robot controller is configured to instruct the robotic arm to perform the action. The EMV certification system further includes a test coordinator communicatively coupled to the credit card simulator, the point of sale simulator, and the robot controller. The test coordinator is configured to request the robot controller instruct the robotic arm based on reading a response from the payment terminal.

12 Claims, 5 Drawing Sheets

(56) References Cited

U.S. PATENT DOCUMENTS

| | | |
|---|---|---|
| 2016/0310831 A1 | 10/2016 | Chun |
| 2016/0337053 A1 | 11/2016 | Diperna et al. |
| 2017/0039566 A1 | 2/2017 | Schipperheijn |
| 2017/0236125 A1 | 8/2017 | Guise et al. |

\* cited by examiner

METHODS AND SYSTEMS OF EMV CERTIFICATION

BACKGROUND

Smart payment cards are payment cards that have integrated chips which store the payment card's data. Europay MasterCard Visa ("EMV") is a technical standard for payment terminals and automated teller machines that accept the smart payment cards. Level 3 EMV certification is an end-to-end certification of an EMV terminal conducted between a merchant and a credit-card brand (a financial institution issuing the payment), with authentication checks made by a processor (a mediator between the merchant and the brand) and/or the brand. The processor and/or the brand check every type of possible transaction between the merchant and a customer paying via the smart payment card. In conventional embodiments, elements of level 3 EMV, such as initiating the transaction, performing actions (i.e. inserting the smart payment card in the payment terminal), or verifying the transaction meets compliance with the standard, are done manually.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

SUMMARY OF PARTICULAR EMBODIMENTS

Aspects of the present disclosure relate generally to payment terminals, and more particularly to a methods and systems of EMV certifying a payment terminal. The technical advantage is an improvement in the hardware that certifies payment terminals against the EMV standard.

An illustrative embodiment disclosed herein is an EMV certification system including a credit card simulator configured to program a probe with credit card data, a point of sale simulator configured to send transaction data to a payment terminal, a robotic arm configured to perform an action on the payment terminal, and a robot controller communicatively coupled to the robotic arm. The robot controller is configured to instruct the robotic arm to perform the action. The EMV certification system further includes a test coordinator communicatively coupled to the credit card simulator, the point of sale simulator, and the robot controller. The test coordinator is configured to request the robot controller instruct the robotic arm based on reading a response from the payment terminal.

Another illustrative embodiment disclosed herein is an a method by an EMV certification system. The system includes a credit card simulator, a point of sale simulator, a robotic arm, a robot controller, and a test coordinator. The method includes sending transaction data to a payment terminal, instructing the robot controller to initiate the robotic arm to perform an action based on reading a response from the payment terminal, initiating the robotic arm to the perform the action based on the instruction from the test coordinator, and performing the action on the payment terminal.

Another illustrative embodiment disclosed herein is an a non-transitory computer-readable storage medium having instructions stored thereon that, upon execution by a computing device, causes the computing device to perform operations including sending transaction data to a payment terminal, reading a response from the payment terminal, initiating a robotic arm to perform an action based on the response, and performing the action on the payment terminal.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
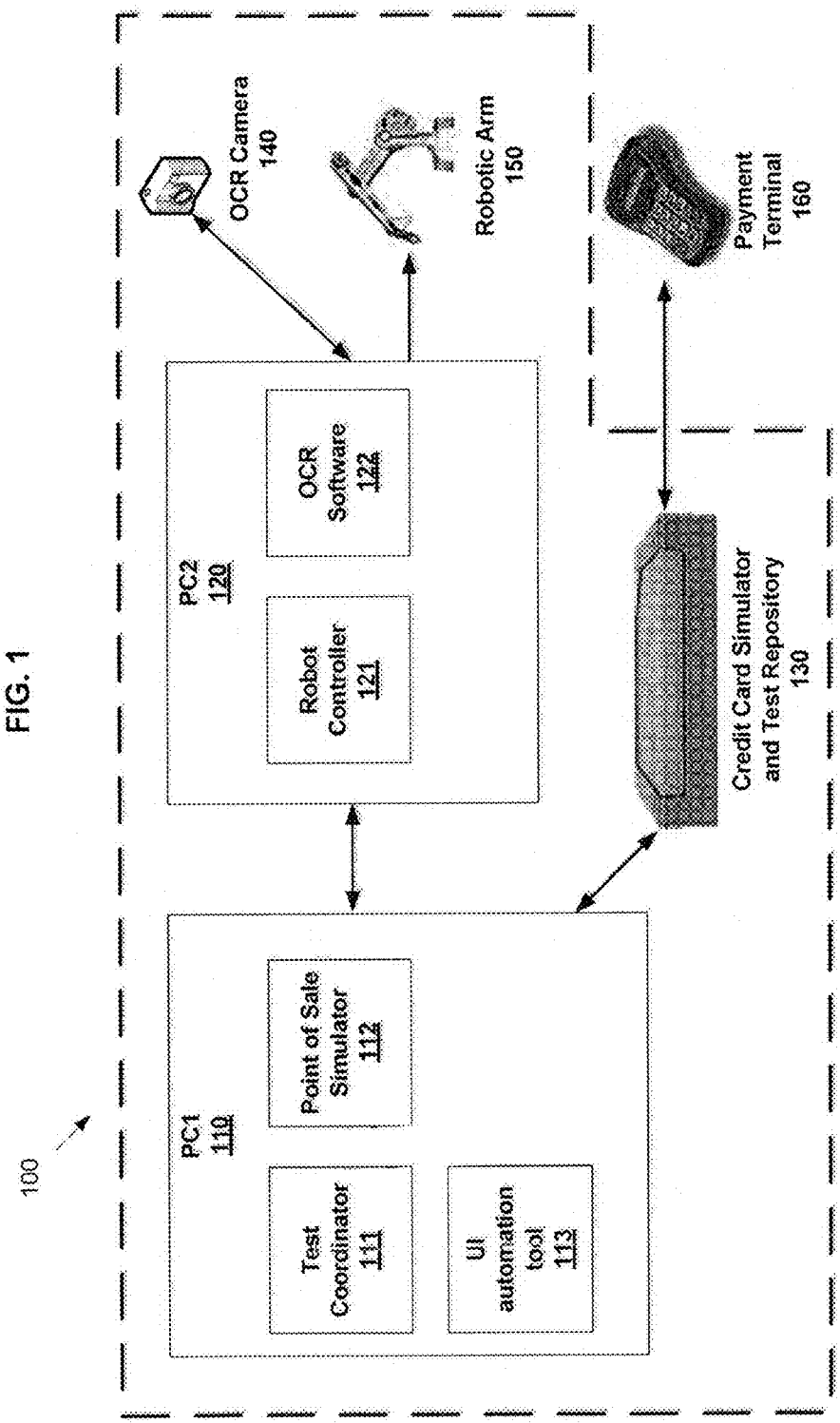
FIG. 1 illustrates an example embodiment of an EMV certification system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Smart payment cards are payment cards that have integrated chips which store the payment card's data. Europay MasterCard Visa ("EMV") is a technical standard for payment terminals and automated teller machines that accept the smart payment cards. Level 3 EMV certification is an end-to-end certification of an EMV terminal conducted between a merchant and a credit-card brand (a financial institution issuing the payment), with authentication checks made by a processor (a mediator between the merchant and the brand) and/or the brand. The processor and/or the brand check every type of possible transaction between the merchant and a customer paying via the smart payment card. In conventional embodiments, elements of level 3 EMV, such as initiating the transaction, performing actions (i.e. inserting the smart payment card in the payment terminal), or verifying the transaction meets compliance with the standard, are done manually.

However, in October 2015, the EMV fraud liability shift for payment terminals commenced. After this date, if a fraud chargeback occurs, a merchant that has not adopted EMV certified payment terminals is liable for covering the fraud. There are thousands of payment terminal software programs. There are numerous credit-card brands, each with different level 3 requirements determined by the brand. Finally, there are different mechanisms for payment including via chip and via magnetic swipe. A merchant who wants the ability to use any of the terminal software programs to process payments from any of the brands using any of these payment mechanisms on their payment terminal has to certify all of the combinations of software programs, brands, and mechanisms. There is a technical need for a fully-automated system for EMV certification for the purpose of streamlining the certification process.

This disclosure is directed towards a method of performing fully-automated EMV certification. The technical advantage is an improvement in the hardware that certifies payment terminals against the EMV standard.

FIG. 1 illustrates an example embodiment of an EMV certification system 100. In some embodiments, additional, fewer, or different structural components may be included and some or all of the structural components may interact with each other in different ways depending on the implementation. The EMV certification system 100 includes PC1 110, PC2 120, credit card simulator and test repository 130, optical character recognition ("OCR") camera 140, and robotic arm 150. The PC1 110 includes a test coordinator 111, a point of sale ("POS") simulator 112, and a user interface ("UI") automation tool 113. The PC2 120 includes a robot controller 121 and a OCR software 122. The PC1 110 is communicatively coupled to the PC2 120 and the credit card simulator and test repository 130. The PC2 120 is communicatively coupled to the OCR camera 140 and the robotic arm 150. The credit card simulator and test repository 130 is communicatively coupled to a payment terminal 160. The card simulator and test repository 130 may be termed as a "card simulator".

The test coordinator 111 receives a configuration file that tells the test coordinator 111 how to control other components of the EMV certification system 100. For example, the configuration file provides the test coordinator 111 with names and definitions of instructions it can send to the robot controller 121 when prompted to. The configuration file can be stored as an extensible markup language ("XML") file. In some embodiments, a user may, via a user interface on test coordinator 111, select a model of the payment terminal 160 and an accompanying test profile, including test cases, that is stored on the credit card simulator 130. In some embodiments, the test coordinator 111 and the credit card simulator 130 may communicate using JavaScript Object Notation ("JSON") packets comprising JSON commands. The test coordinator 111 generates a data file, based on the payment terminal 160 model and one of the test cases, that contains inputs needed for the POS simulator 112 to initiate and confirm a transaction on the payment terminal 160. In some embodiments, the data file may contain pre-determined comma separated name value pairs may be defined according to a payment gateway application programming interface ("API") specification. In some embodiments, the data file is a text (".txt") file.

The POS simulator 112 is configured to receive the inputs from the test coordinator 111 via the UI automation tool 113, translate a format of the inputs into an API format, and send the API commands to the payment terminal 160. The UI automation tool 113 is configured to initiate the transaction in the POS simulator 112 by simulating actions performed by inputs from a keyboard or mouse. In some embodiments, the inputs may comprise transaction data typically entered into the payment terminal 160 by a merchant. The POS simulator 112 is also configured to receive a response from the payment terminal 160. The test coordinator 111 is also configured to interpret the response received from the POS simulator 112. In some embodiments, the test coordinator 111 may communicate with the UI automation tool 113 and the POS simulator 112 using a script comprising instructions in C# programming language.

The test coordinator 111 cycles through the steps in the credit card simulator 130, the POS simulator 112, the robot controller 121, and the OCR software 122. The test coordinator 111 will send instructions to the credit card simulator 130, the robot controller 121, and the OCR 122 when prompted to by the response from the POS simulator 112. In some embodiments, the test coordinator 111 is configured to receive the inputs from the credit card simulator 130, the POS simulator 112, and the OCR camera 140. The test coordinator 111 generates a certification report based on the received inputs.

Figure 2:
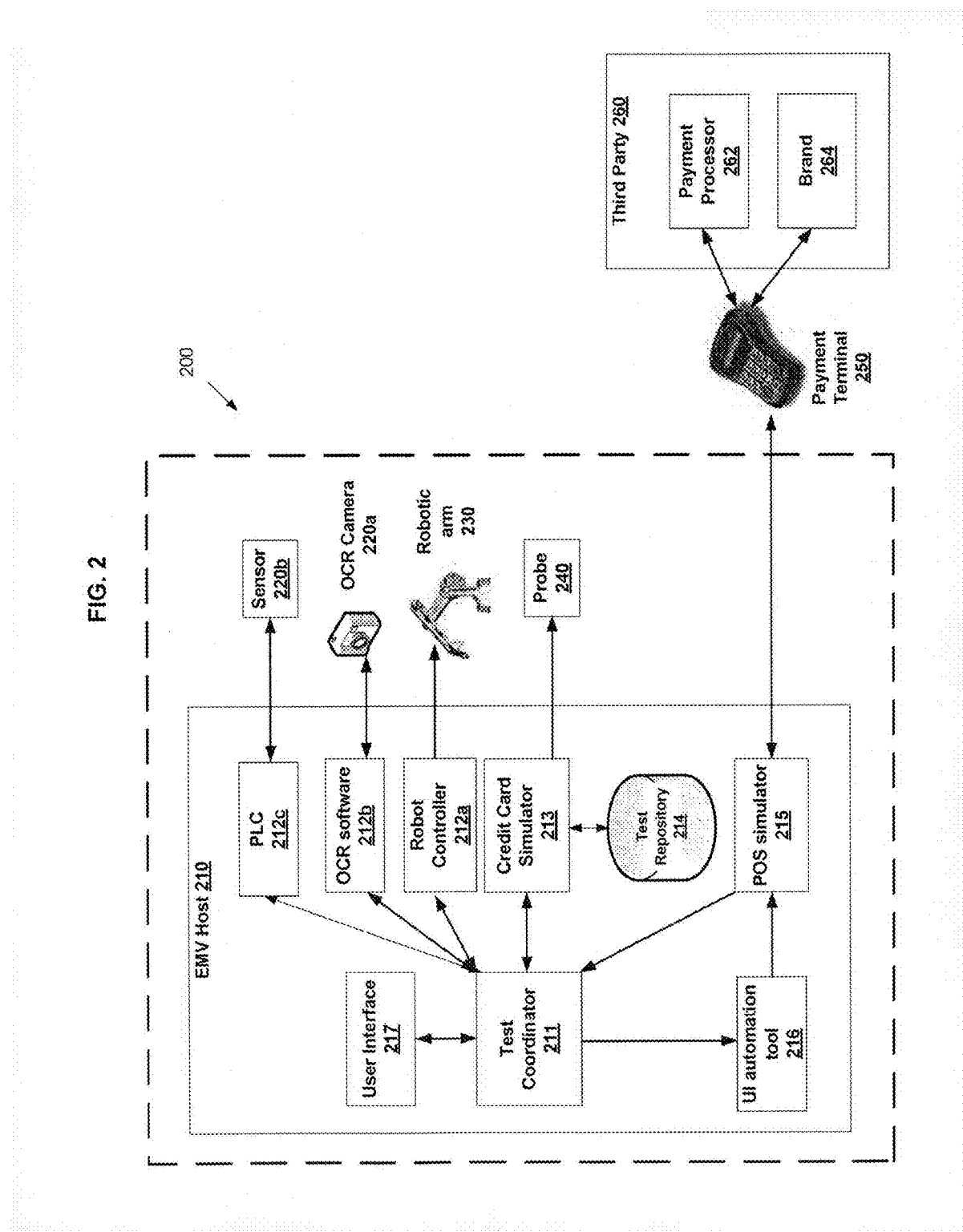
FIG. 2 illustrates another example embodiment of an EMV certification system.

FIG. 2 illustrates an example embodiment of an EMV certification system 200. In some embodiments, additional, fewer, or different structural components may be included and some or all of the structural components may interact with each other in different ways depending on the implementation. The EMV certification system 200 includes an EMV Host 210, an OCR camera 220a, a sensor 220b, a robotic arm 230, a probe 240, a payment terminal 250 and third party 260. The EMV host 210 and components therein are communicatively coupled to the OCR camera 220a, a sensor 220b, the robotic arm 230, the probe 240, and the payment terminal 250. The payment terminal 250 is coupled to the third party 260.

In some embodiments, the EMV host 210 may be a single physical computer comprising hardware resources (for example, processors, memory, and input-output resources), and an operating system that runs applications. The memory devices may include cache, random access memory ("RAM"), and read only memory ("ROM"). In some embodiments, the EMV host 210 may be a physical network of computers and storage resources (for example, local storage, network-attached storage, cloud storage, hard drive disks, and solid state disks). In some embodiments, the EMV host 210 may be a virtual computing environment including underlying hardware resources and virtual machines, wherein each of the virtual machines have their own operating system. The EMV host 210 includes a test coordinator 211, a robot controller 212a, an OCR software 212b, a programmable logic controller ("PLC") 212c, a credit card simulator 213, a test repository 214, a POS simulator 215, a UI automation tool 216, and a user interface 217. The test coordinator 211 is communicatively coupled to the robot controller 212a, the OCR software 212b, the PLC 212c, the credit card simulator 213, the POS simulator 215, the test repository 214, and the user interface 217.

The test coordinator 211 is configured to manage a sequence of events performed by other components in the EMV host 210. In some embodiments, the test coordinator 211 may manage by communicating with a first component by default. The test coordinator 211 may communicate with other components when prompted to by the first component. For example, the test coordinator 211 may communicate with the POS simulator 215 by default. The test coordinator 211 may instruct the POS simulator 215, via the UI automation tool 216, to send transaction data to the payment terminal 250. The test coordinator 211 upon reading a response from another component, may instruct one of the other components to perform a function. In one embodiment, the response is displayed on the payment terminal 250 display, the test coordinator 211 may instruct the OCR software 212b to capture and process the response, and the OCR software 212b may send the processed response to the test coordinator 211. The processed response may be in a text format. In another embodiment, the response is sent in an APT format from the payment terminal 250 to the POS simulator 215, the response is displayed on the POS simulator 215 user interface, the test coordinator 211 may instruct the OCR software 212b to capture and process the response, and the OCR software 212b may send the processed response to the test coordinator 211. The processed response may be in a text format. In yet another embodiment, the response is sent in an API format from the payment terminal 250 to the POS simulator 215, the response is translated by the POS simulator 215 from an API format to a text format and the translated response is sent to the test coordinator 211. In some embodiments where the test coordinator 211 instructs the OCR software 212b to capture and process the response, the OCR software 212b may instruct the OCR camera 220a to generate an image of the response and send the generated image to the OCR software 212b.

In one embodiment of managing, the response from the POS simulator 215 may indicate that the POS simulator 215 is ready for insertion of a credit card into the payment terminal 250. Based on the response, the test coordinator 211 may request the credit card simulator 213 to program the probe 240 with credit card data. Based on the response, the test coordinator 211 may request the robot controller 212a to send instructions to robotic arm 230 to perform an action, such as to insert the probe 240 into the payment terminal 250. In one embodiment, after the test coordinator 211 has communicated with the other components, the test coordinator 211 may probe the PLC 212c for sensor data sent to the PLC 212c from the sensor 220b indicating that the action was performed. In another embodiment, the test coordinator 211 may wait for PLC 212c to send sensor data to the test coordinator 211. In another embodiment, the test coordinator 211 may probe the POS simulator 215 for further instructions or data. In another embodiment, the test coordinator 211 may wait for POS simulator 215 to send further instructions or data, such as an authorization message from the third party 260.

In some embodiments, the test coordinator 211 may manage by following test steps of a pre-determined order. The test coordinator 211 may send a request to a first component in the EMV host 210 to perform an action. The first component sends back a confirmation message when the action is completed. If the action is not completed within a certain time, the test coordinator 211 resends the request to the first component. Once the action to be performed by the first component is complete, the test coordinator 211 sends a request to the second component. The test coordinator 211 may continue to cycle through all the test steps based on the pre-determined order. In one embodiment, the steps and the pre-determined may be determined by the data file. In another embodiment, the steps and the pre-determined order may be determined by one of the other components in the EMV host 210. In yet another embodiment, the test coordinator 211 may receive the steps and the pre-determined order from the user interface 217.

In some embodiments, the test coordinator 211 may be implemented as the test coordinator 111 in FIG. 1. In some embodiments, the test coordinator 211 is a physical computer. In some embodiments, the test coordinator 211 is a virtual machine. In some embodiments, the test coordinator 211 is a central processing unit ("CPU") configured to schedule distribution of its clock cycles to other components in the EMV host 210. In some embodiments, the test coordinator 211 is an application running on an operating system of the EMV host 210. In some embodiments, the test coordinator 211 is a non-transitory computer-readable storage medium having instructions stored thereon that, upon execution by a computing device, causes the computing device to perform operations.

The robot controller 212a is configured to control the robotic arm 230 based on inputs from other components. In some embodiments, the robot controller 212a may receive a request and an instruction for the robotic arm 230 to perform an action, translate the instruction into coordinates and speed of motion, and send the translated instructions to the robotic arm 230 to perform the actions on the payment terminal 250. In some embodiments, the instruction is based on a response from the POS simulator 215. In some embodiments, the instructions is based on the sensor data. In one embodiment, The instruction is for the robot controller 212a to power down the robotic arm 230, and it is based on the sensor data indicating that a door to the EMV certification system 200 test floor is open. In some embodiments, the robot controller 212a may be implemented as the robot controller 121 in FIG. 1.

The OCR software 212b is configured to perform OCR services. In some embodiments, the OCR software 212b may instruct the OCR camera 220a to capture an image. The OCR software 212b may receive a generated image of the payment terminal 250 from the OCR camera 220a. The OCR software 212b may process the generated image sent by the OCR camera 220a to produce text. The processing may be performed using an OCR technique. In one embodiment of the OCR technique, the OCR software 212b may compare the generated image to other stored images, symbols, or character and determine the closest matching stored images, symbols, or character based on criteria comprising color value. The comparison may be done on a on a pixel-by-pixel basis or on a coarser level of granularity. In some embodiments, the OCR technique may be pattern matching. In other embodiments, the OCR technique may be feature extraction. The OCR software 212b may send the text to the test coordinator 211. In some embodiments, the OCR software 212b may be instructed by the test coordinator 211 to capture and process the response which may be displayed the POS simulator 215 user interface or on the payment terminal 250 display. In some embodiments, the OCR software 212b may be implemented as the OCR software 122 in FIG. 1.

The PLC 212c is configured to send commands to the sensor 220b and to receive the sensor data from the sensor 220b. In some embodiments, the sensor data may comprise '1' if the sensor 220*b* has sensed a physical property within a time period. In some embodiments, the sensor data may comprise '0' if the sensor 220*b* has not sensed the physical property within the time period. In some embodiments, the PLC 212*c* may forward the sensor data to the test coordinator 211. The test coordinator 211 may send instructions to the robot controller 212*a* to perform an action based on receiving the sensor data from PLC 212*c*. In embodiment of the action, the robot controller 212*a* instructs the robotic arm 230 to power down. In some embodiments, the PLC 212*c* may be integrated into the computer on which the test coordinator 211 is running. In other embodiments, the PLC 212*c* is a dedicated hardware including a CPU, an input/output ("I/O") interface, and a programming device.

The credit card simulator 213 is configured to program the probe 240 with credit card data. In some embodiments, the credit card simulator 213 may receive an instruction from the test coordinator 211 to program the probe 240. The credit card simulator 213 may receive the credit card data from the test repository 214 which resides in a storage medium. The credit card data may include a credit card name, a credit card number, and a credit card key. In some embodiments, the credit card simulator 213 may send a test case to the test coordinator 211. The test coordinator 211 may generate instructions to be sent to the UI automation tool 216, the POS simulator 215, or the robot controller 212*a* in response to receiving the test case. The test case may be sent as JSON packets comprising JSON commands. The JSON command may contain a header and a body comprising an instruction that is a member of the test case. For example, the instruction may be for the robot controller 212*a* to cause the robotic arm 230 to insert a credit card into the payment terminal 250. In some embodiments, the credit card simulator 213 is an application running on the operating system of EMV host 210. In other embodiments, the credit card simulator 213 is non-transitory storage medium on the EMV host 210, with instructions stored thereon. In some embodiments, the credit card simulator 213 may be implemented as the credit card simulator 130 in FIG. 1.

The test repository 214 is configured to contain the credit card data for all of the credit card brands that the payment terminal 250 is being tested against. In some embodiments, the test repository 214 is a database that resides in a storage medium. For example, the test repository 214 may reside in CPU cache, hard disk drive ("HDD"), or in solid state drive ("SSD"). In some embodiments, the credit card simulator 213 and the test repository 214 reside on a dedicated hardware separate from the hardware on which the test coordinator 211 resides.

The POS simulator 215 is configured to receive the transaction data from the test coordinator 211, translate a format of the transaction data into an API format, and send the transaction data as one or more API commands to the payment terminal 250. In some embodiments, the transaction data may include merchandise name and a merchandise price. In some embodiments, the POS simulator 215 may receive an authorization message from the third party 260 via the payment terminal 250 based on a performed transaction. The POS simulator 215 may forward the authorization message to the test coordinator 211. In some embodiments, the POS simulator 215 may include a user interface on which a user may manually select the transaction data to send to the payment terminal 250. In some embodiments, the POS simulator 215 is an application running on an operating system of the EMV host 210. In other embodiments, the POS simulator 215 is a non-transitory medium with instructions stored thereon.

In some embodiments, the UI automation tool 216 may simulate actions directed towards the user interface of the POS simulator 215 which are performed by inputs from a keyboard or mouse. The simulated actions may be in response to instructions from the test coordinator 211. In some embodiments, the UI automation tool 216 is an application running on an operating system of the EMV host 210. In other embodiments, the UI automation tool 216 is a non-transitory medium with instructions stored thereon.

The user interface 217 is configured to receive inputs from a keyboard, a mouse, a touch, or the like. In some embodiments, the user interface 217 receives a selection of a model of the payment terminal 250 and a test profile. The user interface 217 may forward the selection to the test coordinator 211. In some embodiments, the user interface 217 may receive and display the certification report from the test coordinator 211. The certification report may assert whether the payment terminal 250 is EMV certified based on inputs from the credit card simulator 213, the POS simulator 215, and the OCR software 212*b*. In some embodiments, the user interface 217 is an application running on an operating system of the EMV host 210.

The OCR camera 220*a* is configured to receive an instruction from the OCR software 212*b*, generate an image of the payment terminal 250, and send the generated image to the OCR software 212*b*.

The sensor 220*b* is configured sense an input from a physical environment and to send the sensor data to the PLC 212*c*. In some embodiments, the input may be light, heat, motion, moisture, pressure, or the like. In some embodiments, the sensor 220*b* may sense when the OCR camera 220*a* has taken a picture. In another example, the sensor 220*b* may sense when the robotic arm 230 has moved. In some embodiments, the sensor 220*b* may sense that the payment terminal 250 has received a response from the third party 260. In some embodiments, the sensor 220*b* may be a safety sensor. In one embodiment of the safety sensor, the sensor 220*b* may sense if a door to the EMV certification system 200 test floor is open. In other examples, the safety sensor may comprise an emergency switch, a tactile switch, a strobe light or an alarm buzzer. In some embodiments, the sensor 220*b* may comprise multiple sensor units, each of which sense different inputs.

The robotic arm 230 is configured to receive position coordinates and speed from the robot controller 212*a* and perform actions based on the coordinates and the speed. The position coordinates may identify the location the robotic arm 230 moves to. The speed may identify how fast the robotic arm 230 moves to that location. The position coordinates and speed may vary based on the payment terminal 250 model. The actions performed by the robotic arm 230 may comprise picking up the probe 240, swiping the probe 240 through the payment terminal 250, pressing a pin pad or touch screen on the payment terminal 250, or inserting the probe 240 into the payment terminal 250. In some embodiments, while the robotic arm 230 movement is in progress, the strobe light is turned on. An event such as the door opening during operation or emergency switch activation may cause the robotic arm 230 movements to stop and may trigger a buzzer to give audio warning. In some embodiments, high intensity light emitting diodes along the robotic arm 230 may serve as an awareness barrier.

The probe 240 is configured to emulate the credit card data. The probe 240 is further configured to send the credit card data to the payment terminal 250 via an action performed by the robotic arm 230.

The payment terminal 250 is a device being certified by the EMV certification system 200. In some embodiments, the payment terminal 250 may have an application running thereon, which may receive the API commands from the POS simulator 215 and may send API responses to the POS simulator 215. In some embodiments, the payment terminal 250 may send an encrypted message to the third party 260. The encrypted message may include a first key from the card and a second key from the payment terminal 250. In some embodiments, the payment terminal 250 may receive an authorization message from the third party 260 in response to the third party 260 receiving and decrypting the encrypted message. In some embodiments, the payment terminal 250 has a pin pad. In some embodiments the payment terminal 250 has a touch screen. In some embodiments, the payment terminal 250 has a slot for inserting the smart card and reading the data on the chip on the smart card. In some embodiments, the payment terminal 250 has an apparatus for swiping the magnetic portion of the credit card and reading the data on the magnetic portion.

In some embodiments, the third party 260 may be configured to receive the encrypted message from the payment terminal 250 and send the authorization message to the payment terminal 250 in response to receiving the encrypted message. In some embodiments, the third party 260 may include a payment processor 262 or a brand 264 or both. In some embodiments, the third party 260 may include more than one payment processor 262 or more than one brand 264 or more than one of each. In some embodiments, the third party 260 may include independent software vendors (ISVs). In some embodiments, the third party 260 include issuing banks. In some embodiments, the authorization message may contain results that are based in part on whether the third party 260 is able to decrypt the encrypted message. In some embodiments, the third party 260 may send back a '1' as the authorization message when the payment terminal 250 gets authorization in response to being able to decrypt the encrypted message, and the third party 260 may send a '0' when the payment terminal 250 does not get authorization in response to being unable to decrypt the encrypted message.

In some embodiments, the EMV host 210 includes a payment gateway coupled between the payment terminal 250 and the third party 260. In some embodiments, the data file generated by the test coordinator 211 may be defined according to the payment gateway API specification. In some embodiments, the POS simulator 215 may translate a format of the instructions for the payment terminal 250 into an API format compatible with the payment gateway.

Figure 3:
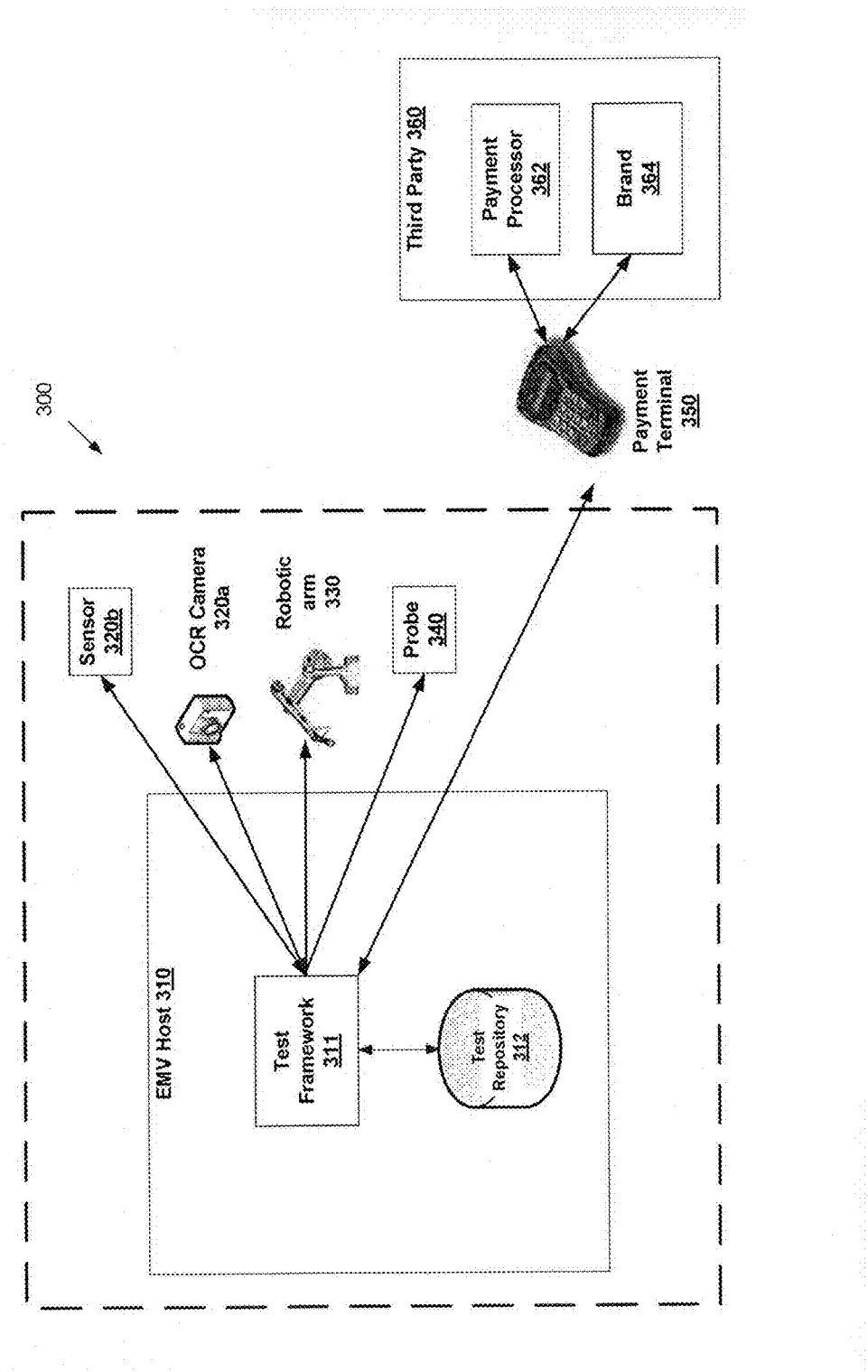
FIG. 3 illustrates another example embodiment of an EMV certification system.

FIG. 3 illustrates an example embodiment of an EMV certification system 200. In some embodiments, additional, fewer, or different structural components may be included and some or all of the structural components may interact with each other in different ways depending on the implementation. The EMV certification system 300 includes an EMV Host 310, an OCR camera 320a, a sensor 320b, a robotic arm 330, a probe 340, a payment terminal 350 and third party 360. The EMV host 310 and the components therein are communicatively coupled to the OCR camera 320a, a sensor 320b, the robotic arm 330, the probe 340, and the payment terminal 350. The payment terminal 350 is coupled to the third party 360. In some embodiments, the EMV certification system 300 may be implemented as EMV certification system 200 in FIG. 2.

The EMV host 310 includes a test framework 311 and a test repository 312. In some embodiments, the EMV host 310 may be implemented as EMV host 210 in FIG. 2. In some embodiments, the test framework 311 may be an application running on an operating system of the EMV host 310 for certifying the payment terminal 350. The test framework 311 may include all the functionality of the test coordinator 211 in FIG. 2, the robot controller 212a in FIG. 2, the OCR software 212b in FIG. 2, the programmable logic controller (PLC) 212c in FIG. 2, the credit card simulator 213 in FIG. 2, the POS simulator 215 in FIG. 2, the UI automation tool 216 in FIG. 2, and the user interface 217 in FIG. 2. The test repository 312 may be implemented as the test repository 214 in FIG. 2.

In some embodiments, the OCR camera 320a may be implemented as the OCR camera 220a in FIG. 2, the sensor 320b may be implemented as the sensor 220b in FIG. 2, the robotic arm 330 may be implemented as the robotic arm 230 in FIG. 2, the probe 340 may be implemented as the probe 240 in FIG. 2, the payment terminal 350 may be implemented as the payment terminal 250 in FIG. 2, and the third party 360 may be implemented as the third party 260 in FIG. 2.

Figure 4:
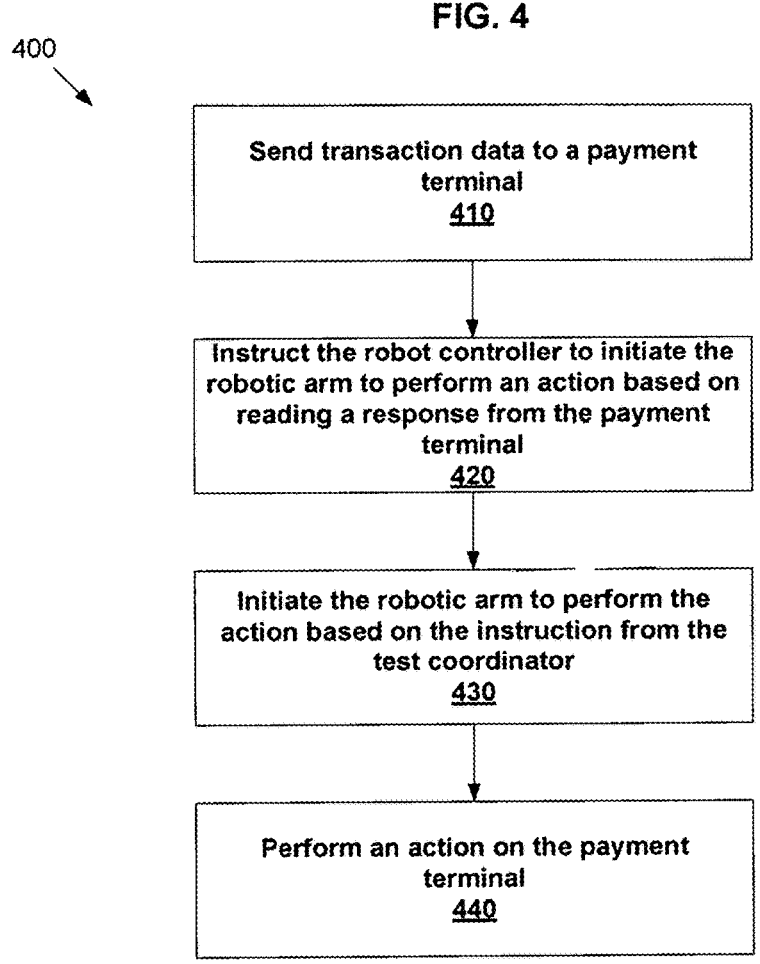
FIG. 4 illustrates an example method of EMV certifying a payment terminal.

FIG. 4 illustrates an example method, by the EMV certification system 200, of EMV certifying the payment terminal 250. In some embodiments, additional, fewer, or different operations may be performed depending on the implementation. At operation 410, the POS simulator 215 sends transaction data to the payment terminal 250. At operation 420, the test coordinator 211 instructs the robot controller 212a to initiate the robotic arm 230 to perform an action based on reading a response from the payment terminal 250. At operation 430, the robot controller 212a initiates the robotic arm 230 to perform an action based on the instruction from the test coordinator 211. In some embodiments, the robot controller 212a initiates by sending an instruction comprising position coordinates and speed of the arm's movement. At operation 440, the robotic arm 230 performs an action on the payment terminal 250.

Figure 5:
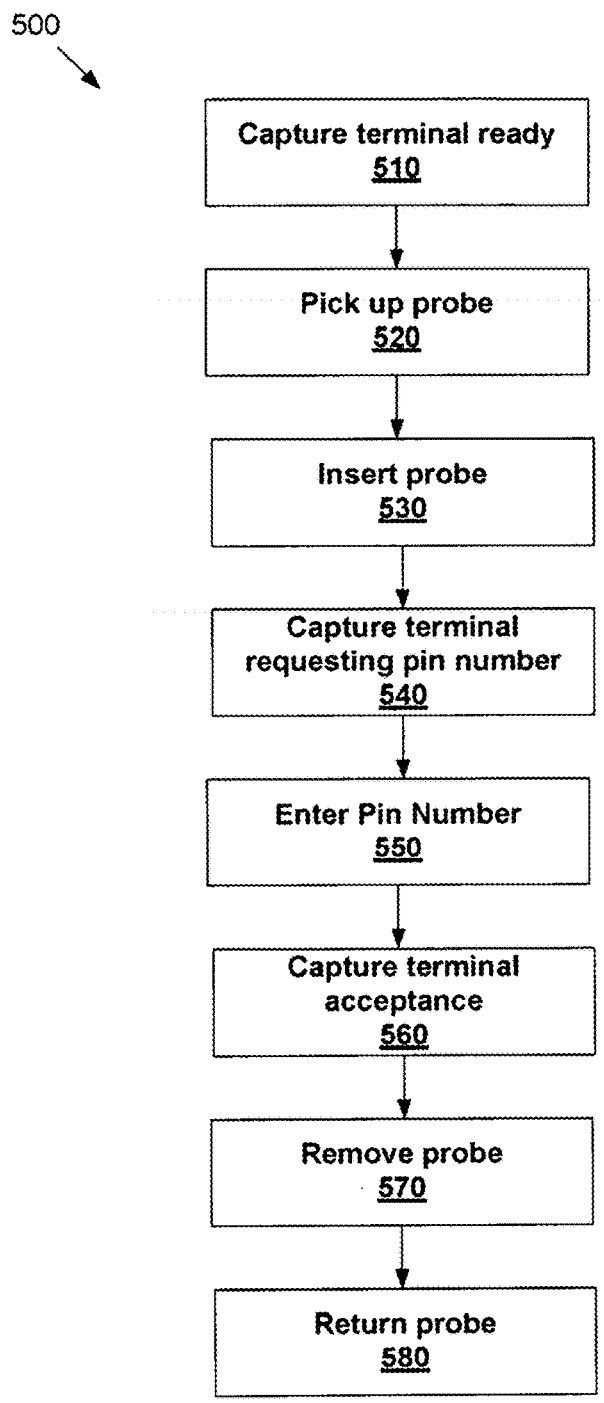
FIG. 5 illustrates an example method of a robotic arm performing an action.

FIG. 5 illustrates an example method of a robotic arm 230 performing an action. In some embodiments, additional, fewer, or different operations may be performed depending on the implementation. The particular action performed is a transaction including an insertion. At operation 510, the OCR camera 220a captures that the payment terminal 250 is ready. At operation 520, the robotic arm 230 picks up the probe 240. At operation 530, the robotic arm 230 inserts the probe 240 into the payment terminal 250. At operation 540, the OCR camera 220a captures the payment terminal 250 requesting a pin number. At operation 550, the robotic arm 230 enters the pin number on the payment terminal 250. At operation 560, the OCR camera 220a captures the payment terminal 250 accepting the pin number. At operation 570, the robotic arm 230 removes the probe 240. At operation 580, the robotic arm 230 returns the probe 240 to its original position.

In some embodiments, every action by the robotic arm 230 may be preceded by an instruction by the robot controller 212a to go to the position coordinates and at the speed corresponding to that given action. The robot controller 212a may translate the coordinates from a command received from the test coordinator 211. Every capture by the OCR camera 220a may be preceded by an instruction by the test coordinator 211 via the OCR software 212b to capture. Every generated image by the OCR camera 220a may be sent to the OCR software 212b to process text and send the text to the test coordinator 211. Every action by the robotic arm 230 may be followed by the sensor 220b sensing that the robotic arm 230 has stopped moving and sending the sensor data via the PLC 212c to the test coordinator 211. Before the test coordinator 211 sends out the next instruction, it may wait for the OCR software 212*b* or the sensor 220*b* to send an input to the test coordinator 211 confirming completion of an action.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed:

1. An EMV certification system comprising:
    a credit card simulator configured to program a probe with credit card data;
    a point of sale simulator configured to send transaction data to a payment terminal;
    a robotic arm configured to insert the probe into the payment terminal such that the payment terminal receives the credit card data;
    a robot controller communicatively coupled to the robotic arm, the robot controller configured to instruct the robotic arm to insert the probe into the payment terminal;
    a test coordinator communicatively coupled to the credit card simulator, the point of sale simulator, and the robot controller, the test coordinator configured to:
        request the robot controller to instruct the robotic arm based on reading a response from the payment terminal;
        receive an authorization message from a third party in response to the third party processing the credit card data, the transaction data, and payment terminal data; and
        generate a certification report based on content of the authorization message,
    an optical character recognition camera configured to generate an image of the payment terminal; and
    an optical character recognition software coupled to the test coordinator and the optical character recognition camera, the optical character recognition software configured to:
        instruct the optical character recognition camera to generate the image;
        receive the generated image of the payment terminal;
        produce text based on the generated image; and
        send the text to the test coordinator.

2. The system of claim 1, wherein the test coordinator reads the response by instructing the optical character recognition software to capture and process the response displayed on the payment terminal, and wherein the optical character recognition software sends the processed response to the test coordinator.

3. The system of claim 1 further comprising:
    a sensor coupled to the test coordinator, the sensor configured to:
        sense whether a door to the EMV certification system is open; and
        send sensor data to the test coordinator.

4. The system of claim 3, wherein the test coordinator is further configured to send a command to the robot controller to power down the robotic arm based on receiving the sensor data.

5. The system of claim 1, wherein the point of sale simulator comprises a user interface, and wherein the system further comprises a user interface automation tool communicatively coupled to the test coordinator and the point of sale simulator, the user interface automation tool configured to automate user actions on the point of sale simulator.

6. The system of claim 1, wherein the credit card simulator is further configured to receive the credit card data from a test repository.

7. A method, by an EMV certification system comprising a credit card simulator, a point of sale simulator, a robotic arm, a robot controller, an optical character recognition camera, optical character recognition software, and a test coordinator, the method comprising:
    sending, by the point of sale simulator, transaction data to a payment terminal;
    instructing, by the test coordinator, the credit card simulator to program a probe with credit card data, based on reading a response from the payment terminal;
    programming, by the credit card simulator, the probe with the credit card data;
    instructing, by the test coordinator, the robot controller to initiate the robotic arm to insert a probe into the payment terminal, based on reading the response from the payment terminal;
    initiating, by the robot controller, the robotic arm to insert the probe into the payment terminal such that the payment terminal receives the credit card data, based on the instruction from the test coordinator; and
    inserting, by the robotic arm, the probe into the payment terminal;
    receiving, by the test coordinator, an authorization message from a third party in response to the third party processing the credit card data, the transaction data, and payment terminal data;
    generating, by the test coordinator, a certification report based on content of the authorization message;
    instructing, by the optical character recognition software, the optical character recognition camera to generate an image;
    generating, by the optical character recognition camera, the image of the payment terminal;
    receiving, by the optical character recognition software, the generated image of the payment terminal; and
    producing, by the optical character recognition software, text based on the generated image.

8. The system of claim 7, wherein the test coordinator reads the response by instructing the optical character recognition software to capture and process the response displayed on the payment terminal, and wherein the optical character recognition software sends the processed response to the test coordinator.

9. The method of claim 7 further comprising:
sensing, by a sensor, whether a door to the EMV certification system is open; and
sending, by the sensor, sensor data to the test coordinator.

10. The method of claim 9, further comprising sending, by the test coordinator, a command to the robot controller to power down the robotic arm based on receiving the sensor data.

11. The method of claim 7, wherein the EMV certification system further comprises a user automation tool, and wherein the point of sale simulator comprises a user interface, the method further comprising automating, by the user interface automation tool, user actions on the point of sale simulator.

12. A non-transitory computer-readable storage medium having instructions stored thereon that, upon execution by a computing device, causes the computing device to perform operations comprising:
sending, by a point of sale simulator, transaction data to a payment terminal;
instructing, by a test coordinator, a credit card simulator to program a probe with credit card data, based on reading a response from the payment terminal;
programming, by the credit card simulator, the probe with the credit card data;
instructing, by the test coordinator, a robot controller to initiate a robotic arm to insert the probe into the payment terminal, based on reading the response from the payment terminal;
initiating, by the robot controller, a robotic arm to insert the probe into the payment terminal such that the payment terminal receives the credit card data, based on the instruction from the test coordinator;
inserting, by the robotic arm, the probe into the payment terminal;
receiving, by the test coordinator, an authorization message from a third party in response to the third party processing the credit card data, the transaction data, and payment terminal data;
generating, by the test coordinator, a certification report based on content of the authorization message;
instructing, by an optical character recognition software, an optical character recognition camera to generate an image;
generating, by the optical character recognition camera, the image of the payment terminal;
receiving, by the optical character recognition software, the generated image of the payment terminal; and
producing, by the optical character recognition software, text based on the generated image.

* * * * *